United States Patent [19]
Lee et al.

[11] Patent Number: 5,893,536
[45] Date of Patent: Apr. 13, 1999

[54] PARAFOIL ASSEMBLY

[75] Inventors: Calvin K. Lee, Needham; John E. Buckley, Marlborough, both of Mass.

[73] Assignee: The United States of America as represented by the Secretary of the Army, Washington, D.C.

[21] Appl. No.: 09/093,637

[22] Filed: May 28, 1998

[51] Int. Cl.$^6$ ............................................. B64D 17/36
[52] U.S. Cl. ................................... 244/149; 244/152
[58] Field of Search ............................ 244/142, 145, 244/149, 152

[56] References Cited

U.S. PATENT DOCUMENTS

| | | | |
|---|---|---|---|
| 2,919,085 | 12/1959 | Horning | 244/152 |
| 3,756,547 | 9/1973 | Snyder et al. | 244/152 |
| 4,065,079 | 12/1977 | Winchurch | 244/152 |
| 4,513,931 | 4/1985 | Kenzie | 244/152 |
| 4,752,050 | 6/1988 | Johnson | 244/149 |
| 4,846,423 | 7/1989 | Reuter | 244/145 |
| 5,209,436 | 5/1993 | Lee | 244/152 |

FOREIGN PATENT DOCUMENTS

| | | | |
|---|---|---|---|
| 265783 | 5/1965 | Australia | 244/901 |
| 417048 | 7/1921 | Germany | 244/152 |

*Primary Examiner*—Galen Barefoot
*Attorney, Agent, or Firm*—Vincent J. Ranucci

[57] ABSTRACT

A parafoil assembly includes a canopy having a plurality of generally parallel inflatable cells and suspension lines extending from opposite sides of each of the cells toward a central area beneath the canopy when the canopy is fully deployed. At least one selected group of the suspension lines is reefed. A loop retains the reefed suspension lines and a cutter is mounted onto the loop and is adapted to cut the loop to release the reefed suspension lines. Upon initial deployment, non-reefed suspension lines are free to extend to permit full deployment of their respective cells, while the reefed suspension lines prevent full deployment of their respective cells. Upon activation of the cutter, the reefed suspension lines are released so as to disreef to permit extension thereof and full deployment of cells connected thereto.

14 Claims, 6 Drawing Sheets

OPENING FORCE FROM TESTS OF SEVEN CELL PARAFOIL 5,893,536

PARAFOIL ASSEMBLY

STATEMENT OF GOVERNMENT INTEREST

The invention described herein may be manufactured, used and licensed by or for the Government for Governmental purposes without the payment to us of any royalties thereon.

BACKGROUND OF THE INVENTION (1) Field of the Invention

This invention relates to ram-air flexible gliding wings, commonly referred to as "parafoils", and is directed more particularly to a parafoil having a cell inflation system providing for orderly cell inflation which reduces the usual high opening forces common in such devices.

(2) Description of the Prior Art

The inflation of a parafoil typically is a very rapid and dynamic process which often results in high and unacceptable opening forces. Before the cells of the parafoil are inflated, the shape of the canopy is highly irregular, and when the canopy unfolds, it is very roughly of a planar configuration exposing all cells to inflation more or less simultaneously, producing a large opening force.

Referring to FIGS. 1-3, one attempt to reduce the sudden large opening force typically experienced, includes reefing the central cells while permitting outer cells to be free to inflate (FIG. 1). Thereafter, cells on either side of a central cell are allowed to inflate (FIG. 2), and, finally, the central cell is allowed to inflate (FIG. 3). Thus, the cells are opened in stages in the span-wise direction, as illustrated in FIGS. 1-3. In practice, the reefing procedure has been found to require overly complex and time-consuming rigging of the parafoil.

Referring to FIGS. 4-7, another attempt to reduce the large opening force common in parafoils involves use of a slider, i.e., a ring in which are disposed all of the suspension lines. The slider holds the suspension lines close together momentarily to restrain the cells from rapid spread and inflation. The slider slides down the suspension line to regulate inflation. While helpful in some situations, the slider method is passive and does not provide active inflation control.

There thus remains a need for a parafoil assembly including means for effecting orderly cell inflation that produces relatively low opening forces.

SUMMARY OF THE INVENTION

In view thereof, an object of the invention is to provide a parafoil assembly including means for effecting an orderly cell inflation process that results in low opening forces.

With the above and other objects in view, as will hereinafter appear, a feature of the present invention is the provision of a parafoil assembly comprising a canopy including a plurality of generally parallel inflatable cells, and suspension lines extending from opposite sides of each of the cells toward a central area beneath the canopy when the canopy is fully deployed, with at least one selected group of the suspension lines being reefed. A loop retains the reefed suspension lines, and a cutter is disposed adjacent the loop and is adapted to cut the loop to release the reefed suspension lines. Upon initial deployment of the canopy, the suspension lines, other than the reefed suspension lines, are free to extend to permit full deployment of their respective cells, while the reefed suspension lines prevent full deployment of their respective cells. Upon activation of the cutter, the reefed suspension lines are released so as to disreef to permit extension thereof and full deployment of cells connected thereto.

The above and other features of the invention, including various novel details of construction and combinations of parts, will now be more particularly described with reference to the accompanying drawings and pointed out in the claims. It will be understood that the particular devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENTS

Figure 8:
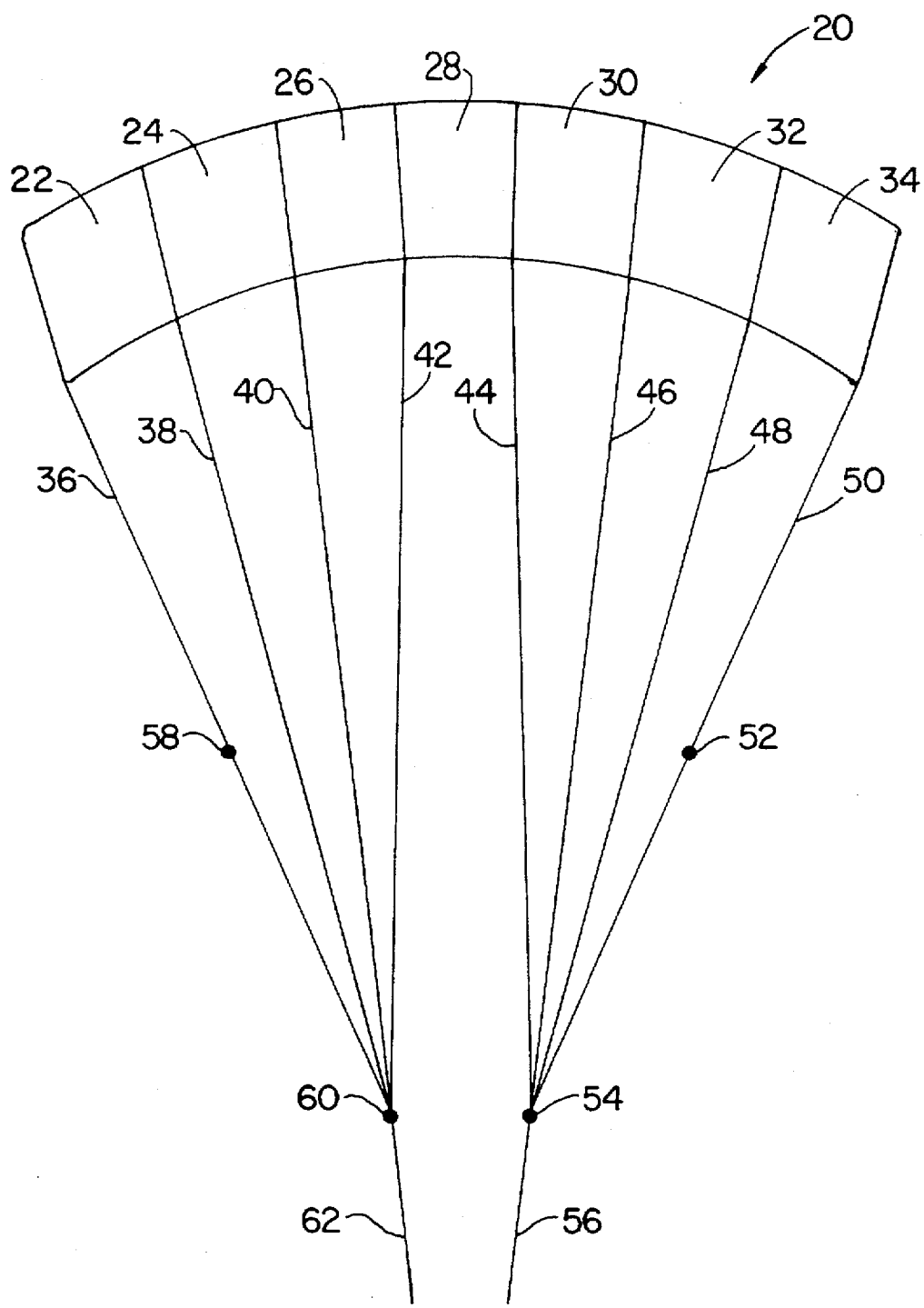
FIG. 8 is a front diagrammatic view of one form of parafoil assembly in a fully deployed condition and illustrative of an embodiment of the invention.

Referring to FIG. 8, there is shown, diagrammatically, a fully inflated parafoil 20 having cells 22, 24, 26, 28, 30, 32 and 34. Each cell has fixed thereto groups of suspension lines 36, 38, 40, 42, 44, 46, 48 and 50. Each group includes a plurality of lines as, for example, 50a, 50b, 50c and 50d, shown in FIG. 10, with the suspension line 50a supporting a front portion of the cell 34, the suspension line 50b supporting a rear portion of the cell 34, and suspension lines 50c and 50d supporting the center of the cell 34.

The suspension line group 50 is gathered at points 52 and 52a and is reefed to points 54 and 54a. Risers 56 and 56a extend from the points 54 and 54a, respectively. The suspension line group 36 is gathered at points 58 (one shown in FIGS. 8 and 9) and are reefed to points 60. Risers 62 (one shown in FIGS. 8 and 9) extend from the points 60.

The suspension line groups 36, 50 are provided with reefing lines 64 (FIGS. 9 and 10), each fixed at one end to the appropriate suspension line point 52, 58, and at the other end having a ring 66 fixed thereon. Reefed portions 68 of suspension line groups 36, 50, between points 52 and 54, and points 58 and 60, are provided at their lower ends with rings 67 which, along with the rings 66 are mounted on a line loop 70.

A cutter 72 is mounted onto the line loop 70, with a portion of the line loop disposed adjacent at least one cutting edge of the cutter 72. The parafoil 20 is provided with cutter actuation means (not shown) for engaging the cutter 72 with the line loop 70 to sever the line loop to release the reefed suspension lines.

Figure 9:
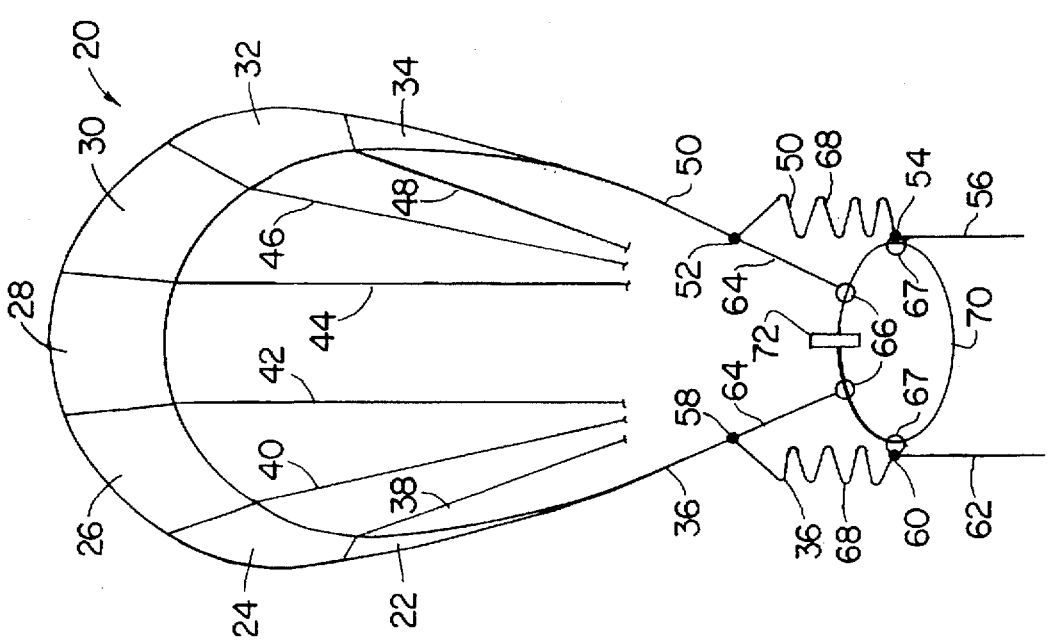
FIG. 9 is a front diagrammatic view of the parafoil assembly of FIG. 8 in an early stage of deployment.

As is shown in FIG. 9, the reefing of the suspension line groups 36 and 50, draws the cells 22, 24, 26 and the cells 30, 32 and 34 into a generally inverse tear drop configuration.

Figure 10:
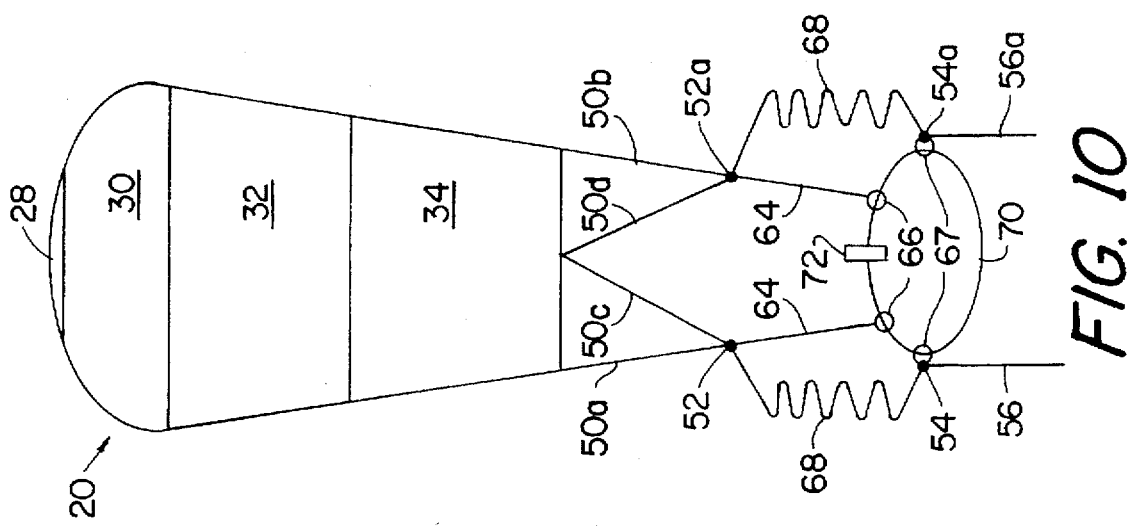
FIG. 10 is a side diagrammatic view of the parafoil assembly of FIG. 9.

In operation, the parafoil 20 initially deploys as shown in FIGS. 9 and 10, in a generally streamline inverse teardrop configuration. The central cells 26, 28, 30 inflate while the outer cells 22, 24, 32, 34 remain substantially closed, providing low drag forces and low opening forces. Once the central cells are well inflated and the teardrop shape is formed, the cutter 72 is activated to sever the line loop 70 and release the rings 67 and thereby release the suspension line portions between points 52 and 54, and between points 58 and 60, and to release the rings 66 and thereby release the reefing lines 64 permitting the suspension line groups 36, 50 to extend, thereby to permit the outer cells 22, 24, 32, 34 to inflate.

In a preferred embodiment, the suspension lines are about 123 feet long, and about 45% of the length of the suspension lines are reefed. Upon deployment, a few seconds are required for the canopy to form into the teardrop shape. The cutter actuator may be triggered by a time clock (not shown) actuated by opening of the parafoil pack for deployment of the parafoil. It has been found that a delay of about four seconds from deployment to actuation of the cutter 72 is satisfactory.

While a seven cell parafoil is shown in the drawings, it will be apparent that larger parafoils with larger numbers of cells may be similarly arranged. For the largest parafoils, reefed suspension lines can be released in steps by a plurality of cutters.

Figure 12:
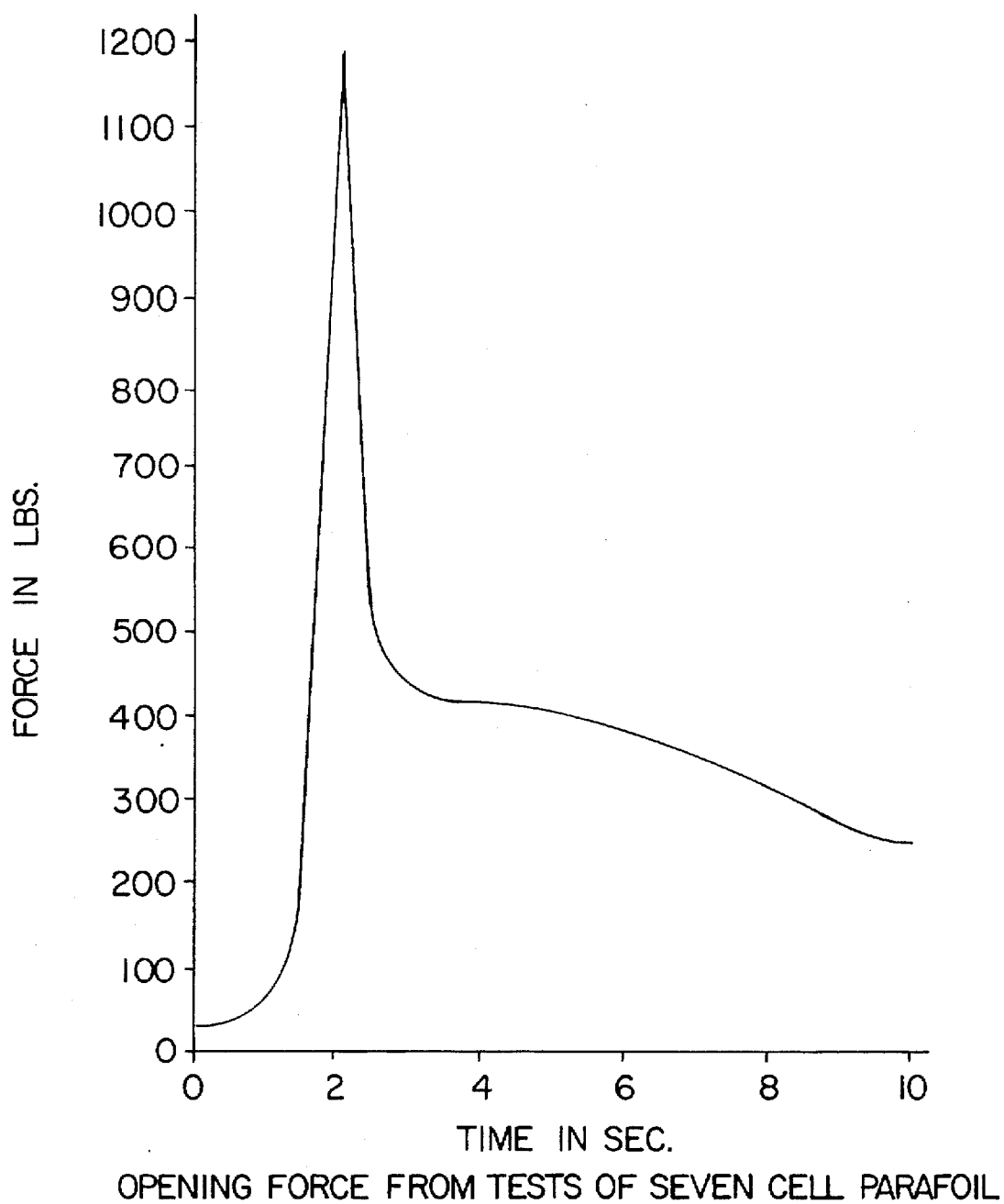
FIGS. 12-14 are graphs illustrating performance characteristics of prior art parafoils and the embodiment of parafoil of FIGS. 8-10.
Figure 14:
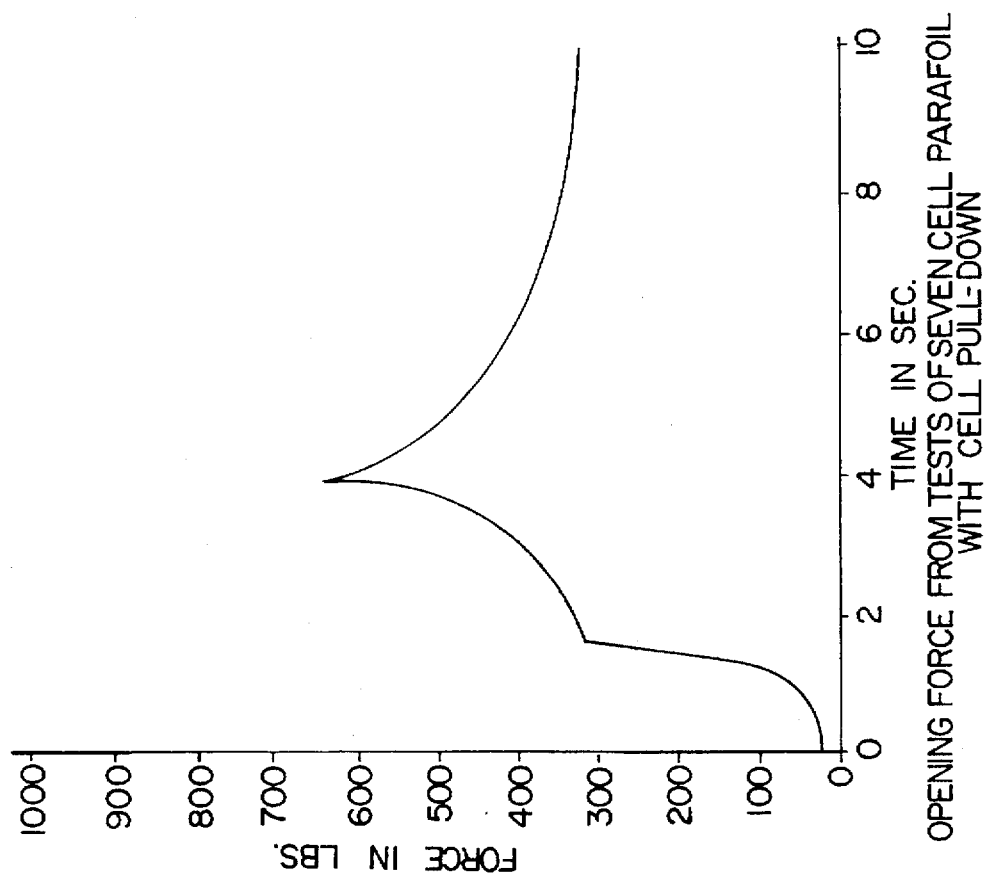
Figure 13:
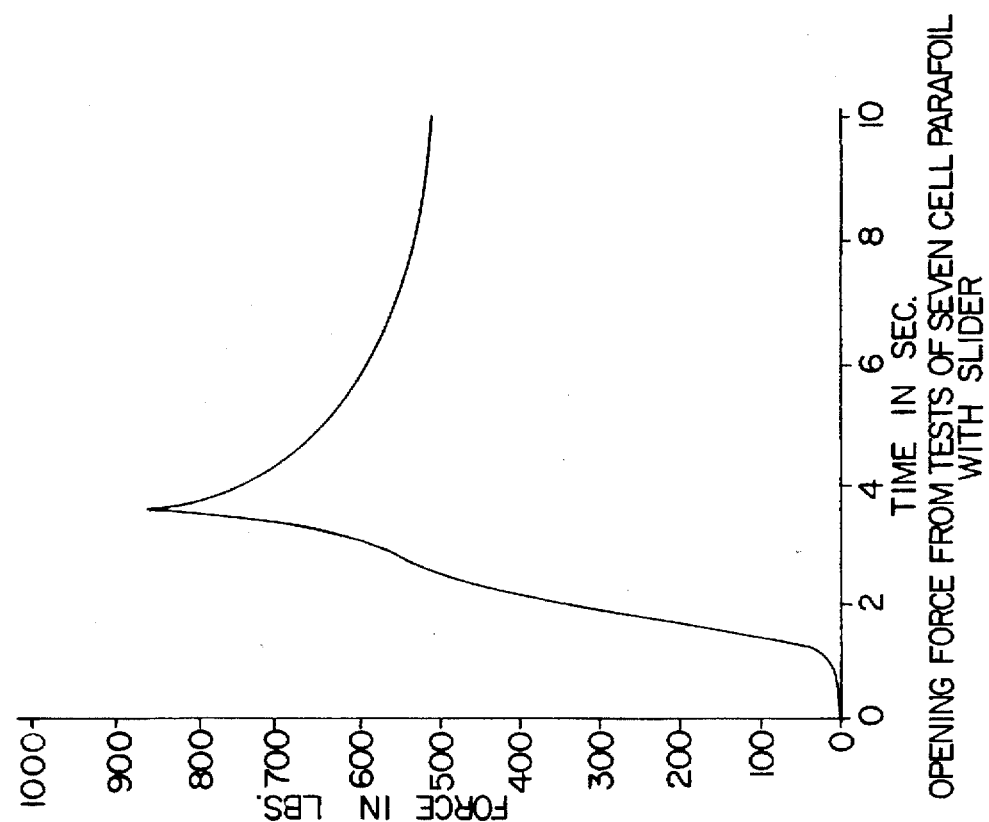

In FIGS. 12–14, the advantages of the above-described parafoil assembly, compared to prior art parafoil assemblies, are shown. The graphs of FIGS. 12–14 provide results of tests wherein a 220 ft$^2$ seven cell parafoil was drop tested with a 150 lb. load from about 600 feet. A 40 inch pilot chute was used to deploy the parafoil. Referring first to FIG. 12, it will be seen that in a parafoil assembly of the type shown in FIGS. 1–3, but without any reefed suspension lines, about two seconds after initial deployment, the canopy essentially "snapped" open very sharply with an opening force of about 1197 lbs. Referring to FIG. 13, it will be seen that under the same conditions, and fitted with a slider, as shown in FIGS. 4–7, to restrain the rapid cell spread and inflation, the peak opening force is reduced to under 900 lbs. at just over four seconds. Under the same conditions, the parafoil assembly described above, with reefed outer cells, exhibited a maximum force of about 650 lbs. (FIG. 14) after about 4½ seconds, i.e., shortly after activation of the line loop cutter.

The tests illustrate that through the controlled and orderly deployment and inflation provided by the instant assembly, the opening forces are relatively flat and low in magnitude compared to the basic parafoil and compared to the basic parafoil with the slider thereon.

Figure 11:
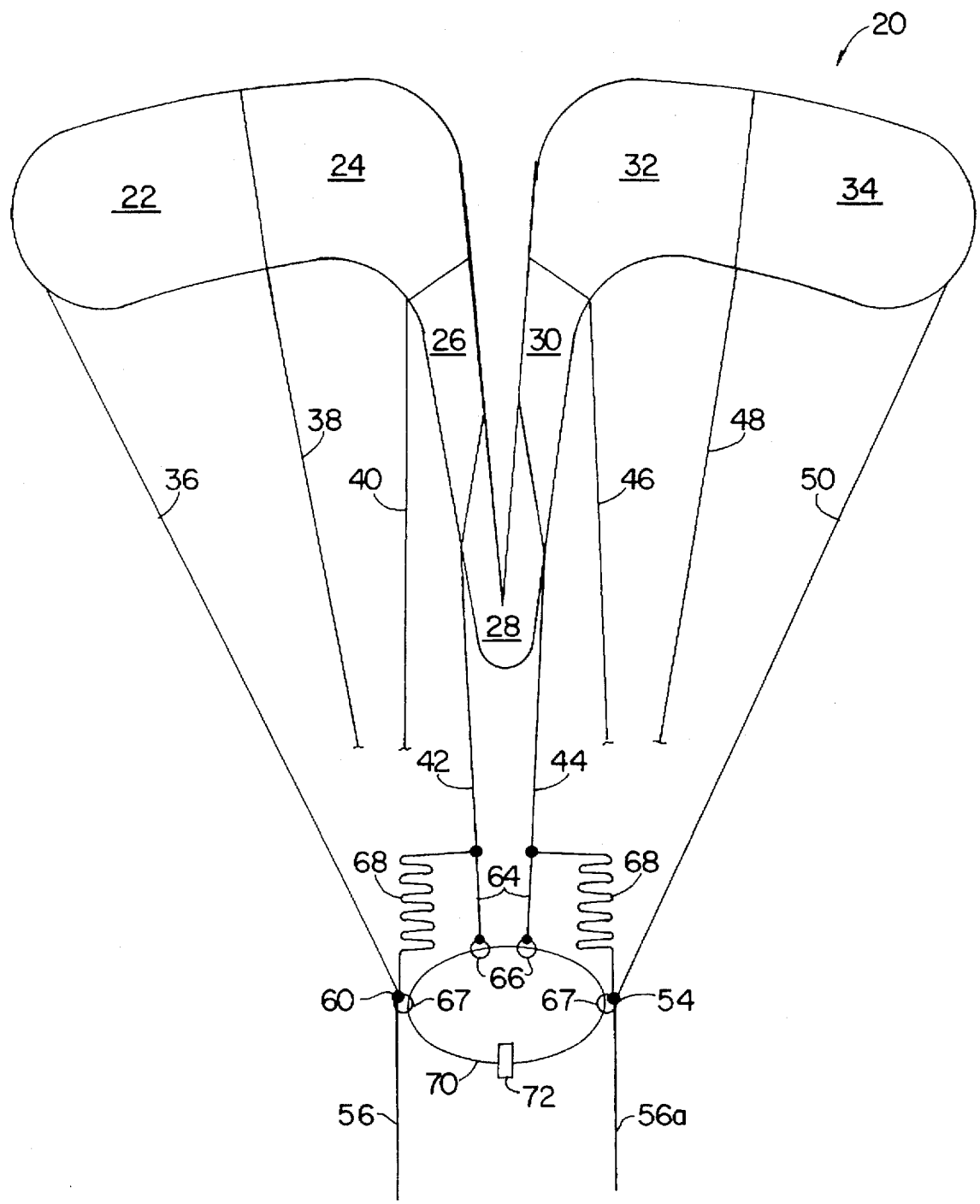
FIG. 11 is similar to FIG. 9, but showing another form of parafoil assembly illustrative of an alternative embodiment of the invention.

In FIG. 11 there is shown an alternative embodiment in which central cells 26, 28, 30 are reefed and outer cells 22, 24, 32, 34 are not reefed. The operation of the embodiment shown in FIG. 11 is similar to the operation of the embodiment shown in FIGS. 8–10. In the FIG. 11 embodiment, the canopy forms a T-shape upon deployment. Upon release of the reefed suspension lines 42, 44 by the cutter 72, the center cells rise and open to complete the inflation process. Since the T-shape experiences a higher drag force than the teardrop shape, this T-shape embodiment produces higher opening forces than the assembly of FIGS. 9 and 10.

In tests of the embodiment of FIG. 11, the canopy formed a T-shape after initial deployment. The two end cells of each side 22, 24, and 32, 34, were inflated, while the three center cells 26, 28, 30 remained substantially closed. Upon actuation of the cutter 72, the center cells rose and opened to complete the inflation process. Inasmuch as the T shape is less streamlined than the teardrop shape, the opening forces of the center reefed assembly were higher than those of the end reefed assembly, but comparable to those of the slider type assembly. The higher drag force of the T shape results in lower falling velocities during inflation, as compared to those of the teardrop shape. In some situations, as in low altitude drops, it can be an advantage to have less altitude loss during a given time period.

Figure 1:
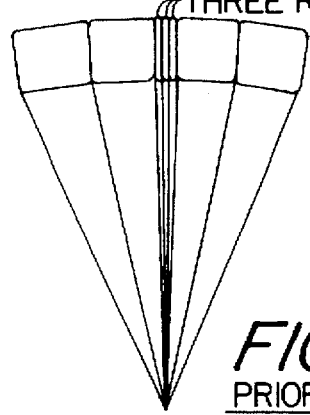
FIGS. 1-3 are diagrammatic illustrations of a prior art parafoil assembly.
Figure 2:
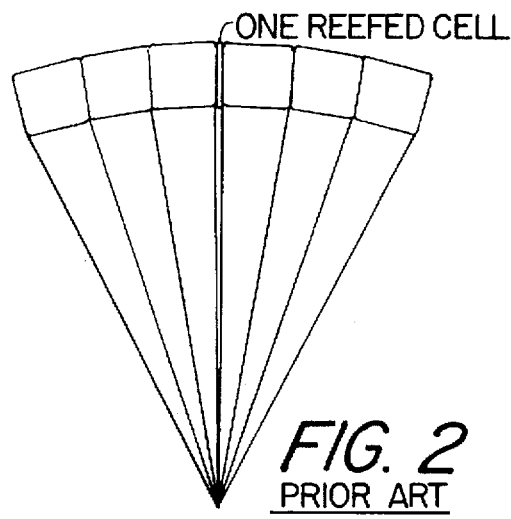
Figure 3:
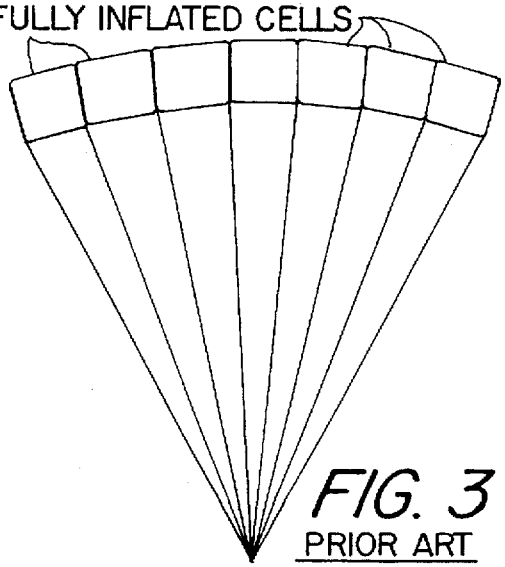
Figure 4:
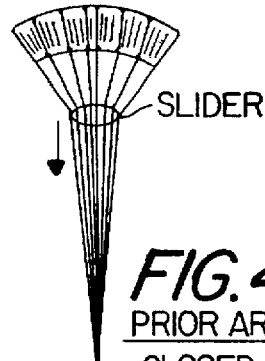
FIGS. 4-7 are diagrammatic illustrations of another prior art parafoil assembly.
Figure 5:
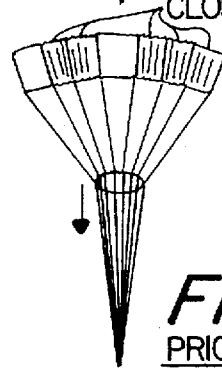
Figure 6:
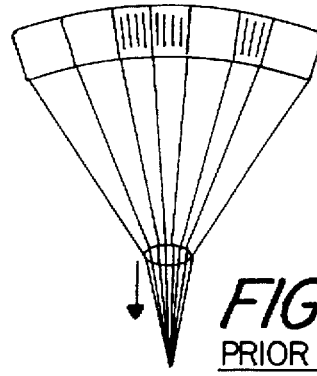
Figure 7:
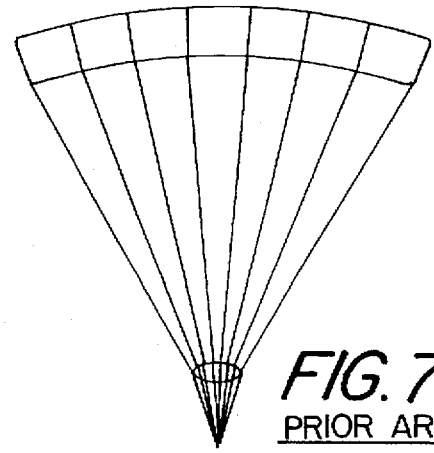

Tests were not run on the embodiment shown in FIGS. 1–3 for comparison with the above inventive embodiments, inasmuch as the rigging procedures for the embodiment in FIGS. 1–3 are unacceptably complex.

There is thus provided parafoil assemblies which include means for effecting orderly cell inflation that produces low opening forces and which are relatively easy to rig.

It is to be understood that the present invention is by no means limited to the particular construction herein disclosed and/or shown in the drawings, but also comprises any modifications or equivalents within the scope of the claims.

For example, in larger parafoils, typically having more than seven cells, it is beneficial to combine the two above-described embodiments and reef both central and outboard cells while leaving cells therebetween free for early deployment. Such an arrangement produces an M-shape configuration (not shown) upon initial deployment.

What is claimed is:

1. A parafoil assembly comprising:
   a canopy including a plurality of generally parallel inflatable cells;
   suspension lines extending from opposite sides of each of said cells toward a central area beneath said canopy when said canopy is fully deployed, at least one selected group of said suspension lines being reefed;
   a loop for retaining said reefed suspension lines; and
   a cutter disposed adjacent said loop and adapted to cut said loop to release said reefed suspension lines;
   whereby upon initial deployment of said canopy, said suspension lines, other than said at least one selected group of suspension lines, are free to extend and permit full deployment of their respective cells, while said reefed suspension lines prevent full deployment of their respective cells; and
   whereby upon activation of said cutter, said at least one selected group of suspension lines is released so as to disreef to permit extension thereof and full deployment of cells connected to said selected group of suspension lines.

2. The parafoil assembly in accordance with claim 1 wherein said at least one selected group comprises a first group of said suspension lines connected to outboard ones of said cells proximate a first end of said canopy and a second group of suspension lines connected to other outboard ones of said cells proximate a second end of said canopy.

3. The parafoil assembly in accordance with claim 2 wherein said loop retains said first and second groups of said suspension lines.

4. The parafoil assembly in accordance with claim 3 wherein after said initial deployment and prior to said activation of said cutter, said groups of reefed suspension lines cause said assembly to assume an inverse teardrop configuration.

5. The parafoil assembly in accordance with claim 1 wherein said at least one selected group comprises suspension lines connected to centrally disposed ones of said cells.

6. The parafoil assembly in accordance with claim 5 wherein said at least one selected group comprises a first group of said suspension lines connected to said centrally disposed cells and cells off-center and proximate and removed from a first end of said canopy and a second group of said suspension lines connected to said centrally disposed cells and cells off-center and proximate and removed from a second end of said canopy.

7. The parafoil assembly in accordance with claim 6 wherein said loop retains said first and second groups of said suspension lines.

8. The parafoil assembly in accordance with claim 7 wherein after said initial deployment and prior to said activation of said cutter, said groups of reefed suspension lines cause said assembly to assume a generally T-shaped configuration.

9. The parafoil assembly in accordance with claim 1 wherein said cutter is adapted to cut said loop about four seconds after said initial deployment of said canopy.

10. A parafoil assembly comprising:

a canopy including a plurality of generally parallel inflatable cells;

suspension lines extending from opposite sides of each of said cells toward a central area beneath said canopy when said canopy is fully deployed, outer ones of said suspension lines being reefed;

a loop for retaining a first group of said reefed outer suspension lines on a first side of said central area, and for retaining a second group of said reefed outer suspension lines on an opposite side of said central area; and a cutter disposed adjacent said loop and adapted to cut said loop to release said first and second groups of suspension lines;

whereby upon initial deployment of said canopy, centrally disposed ones of said suspension lines between said first and second groups of outer suspension lines, are free to extend and permit full deployment of centrally disposed ones of said cells of said canopy, while said reefed suspension lines prevent full deployment of outer ones of said canopy cells; and whereby upon activation of said cutter, said first and second groups of suspension lines are released so as to disreef to permit extension thereof and full deployment of said canopy outer cells.

11. The parafoil assembly in accordance with claim 10 wherein said plurality of cells comprises seven cells, said centrally disposed cells comprise three of said cells nearest a center of said canopy, and said outer cells include two cells between said centrally disposed cells and a first end of said canopy and two cells between said centrally disposed cells and a second end of said canopy.

12. The parafoil assembly in accordance with claim 10 wherein said canopy is adapted to assume an inverse teardrop configuration after said initial deployment of said canopy and before said activation of said cutter.

13. A parafoil assembly comprising:

a canopy including a plurality of generally parallel inflatable cells;

suspension lines extending from opposite sides of each of said cells toward a central area beneath said canopy when said canopy is fully deployed, centrally disposed ones of said suspension lines being reefed;

a loop for retaining said reefed suspension lines; and a cutter disposed adjacent said loop and adapted to cut said loop to release said reefed suspension lines;

whereby upon initial deployment of said canopy, said suspension lines, other than said reefed suspension lines, are free to extend and permit full deployment of outer ones of said cells, while said reefed suspension lines prevent full deployment of said centrally disposed ones of said cells; and whereby upon activation of said cutter, said reefed suspension lines are released so as to disreef to permit extension thereof and full deployment of said centrally disposed cells.

14. The parafoil assembly in accordance with claim 13 wherein said canopy is adapted to assume a generally T-shaped configuration after said initial deployment of said canopy and before said activation of said cutter.

* * * * *